United States Patent
Vadrevu et al.

(12) 
(10) Patent No.: US 11,487,834 B1
(45) Date of Patent: Nov. 1, 2022

(54) FILTERING RESULTS BASED ON HISTORIC FEATURE USAGE

(71) Applicant: Capital One Services, LLC, McLean, VA (US)

(72) Inventors: Vyjayanthi Vadrevu, Chicago, IL (US); Joshua Edwards, Philadelphia, PA (US); Phoebe Atkins, Rockville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/230,466

(22) Filed: Apr. 14, 2021

(51) Int. Cl.
G06F 16/9535 (2019.01)
G06F 16/9538 (2019.01)

(52) U.S. Cl.
CPC ...... G06F 16/9535 (2019.01); G06F 16/9538 (2019.01)

(58) Field of Classification Search
CPC ............. G06F 16/9535; G06F 16/9538; G06F 16/335; G06F 16/337; G06F 16/338; G06F 16/635
See application file for complete search history.

(56) References Cited

U.S. PATENT DOCUMENTS

| 2011/0302300 A1* | 12/2011 | Kikkawa | H04L 12/2809 709/224 |
| 2012/0192096 A1* | 7/2012 | Bowman | G06F 3/04895 715/780 |
| 2014/0195297 A1* | 7/2014 | Abuelsaad | G06Q 10/0635 705/7.28 |
| 2019/0318640 A1* | 10/2019 | Goel | G02B 27/017 |
| 2020/0371673 A1* | 11/2020 | Faulkner | G06F 3/017 |
| 2020/0402516 A1* | 12/2020 | Trim | H04L 67/12 |

* cited by examiner

Primary Examiner — Mariela Reyes
Assistant Examiner — Fatima P Mina
(74) Attorney, Agent, or Firm — Banner & Witcoff, Ltd.

(57) ABSTRACT

Aspects described herein may provide modification of recommendations from a recommendation engine for a product or a device. The recommendation engine may provide initial search results for a particular type of device. The initial search results may be modified to ensure inclusion of devices that include features that the user considers important. Features that the user considers important may be determined based on observing the user's interaction with another device of the same type. By observing the user's interaction with the other device over a period of time, features that the user commonly uses and features that the user sparingly uses may be determined. The initial search results may then be modified to remove devices that do not include the features frequently used by the user and therefore considered important to the user.

17 Claims, 8 Drawing Sheets

FILTERING RESULTS BASED ON HISTORIC FEATURE USAGE

FIELD OF USE

Aspects of the disclosure relate generally to identifying devices of interest to a user. More specifically, aspects of the disclosure provide techniques for modifying search results for a device based on historical usage of features of a related device.

BACKGROUND

A user may use a recommendation engine to search for a product or device of interest, such as a home appliance. For example, a user may conduct a web-based search for a new home appliance to replace a current home appliance. Conventional recommendation engines fail to provide search results that consider features of the current home appliance that are important to the user, and therefore are considered important to the user to be included in the replacement home appliance. This is, in part, because conventional recommendation engines do not have information about how a user might have interacted with a current home appliance. Conventional recommendation engines instead provide search results based on shopping patterns of other users or based on other metrics that do not reflect the actual usage of the current home appliance by the user. The listing of products from these conventional recommendation engines therefore include many products that do not include the features the user likely wants in the new product. For example, if a user frequently uses a "keep warm" feature on the user's current stove, then including stoves without that feature in search results might be unhelpful and might encourage the user to inadvertently purchase a stove without desired functionality. Consequently, the user is required to wade through long listings of products to identify which products include the features considered important to the user, thereby making the shopping process for the user laborious, frustrating, and time-consuming.

Aspects described herein may address these and other problems, and generally enable a user to more quickly and efficiently shop for a product that is to include features the user considers important.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide modification of recommendations, from a recommendation engine, for a product or a device. The recommendation engine may provide initial search results for a particular type of device. For example, a user might search for a new refrigerator, and the initial search results might comprise indications of a plurality of refrigerators for purchase. The initial search results may be modified to ensure inclusion of devices that include features that the user considers important. For example, the initial search results may be modified to ensure that refrigerators with in-door water dispensers, a feature determined to be important to the user, are included. Features that the user considers important may be determined based on observing the user's interaction with a prior device of the same type. By observing the user's interaction with the prior device over a period of time, features that the user commonly uses and features that the user sparingly uses may be determined. For example, use, by a user, of a past refrigerator might be monitored, and the monitoring may indicate that the user uses an in-door water dispenser in the refrigerator multiple times a day. The initial search results may then be modified to remove devices that do not include the features frequently used by the user and therefore considered important to the user. For example, refrigerators without in-door water dispensers might be removed from the initial search results. By modifying the initial search results, the resulting search results are customized based on the user's historical feature usage interaction. The user may therefore more quickly and efficiently identify a device that will meet the needs of the user, and is no longer required to conduct a detailed review of each identified device to ensure it includes the features of interest to the user.

For example, some aspects described herein may provide a computer-implemented method for filtering shopping results for a device based on a user's feature usage history. A set of features for a first device (e.g., initial device) may be determined. For example, a microwave may have a timer function, a cook function, and a special popcorn function. Data indicating interaction, by a user, with the set of features of the first device may be received. A frequency of use of each feature of the set of features of the first device may be determined based on the data indicating interaction with the set of features by a user. For example, a user might be found to use the cook function and the special popcorn function frequently, but the timer function less frequently. The determined frequency of use of each feature of the set of features may be compared to a predetermined threshold. A subset of the set of features may be determined based on the comparison. For example, each feature of the subset of the set of features having a frequency of use that exceeds the predetermined threshold may be included in the subset. For example, based on the high frequency of use, by the user, of the cook function and the special popcorn function, these features might be determined in a subset. Data indicating each available feature for each second device of a set of second devices may then be received. Each second device of the set of second devices may be of a same type as the first device. A subset of the set of second devices may be determined, with each second device of the subset of the set of second devices including each feature of the subset of the set of features for the first device. For example, the subset of the set of second devices might be selected based on determining that each of the subset of the set of second devices has both a cook function and some form of a popcorn function. Information identifying each second device of the subset of the set of second devices may then be provided to the user. Information indicating the availability of the subset of the set of features for each second device of the subset of the set of second devices may also be provided to the user. For example, search results might be displayed in a manner that indicates, to the user, that certain products have both the cook functionality and some form of a popcorn function.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
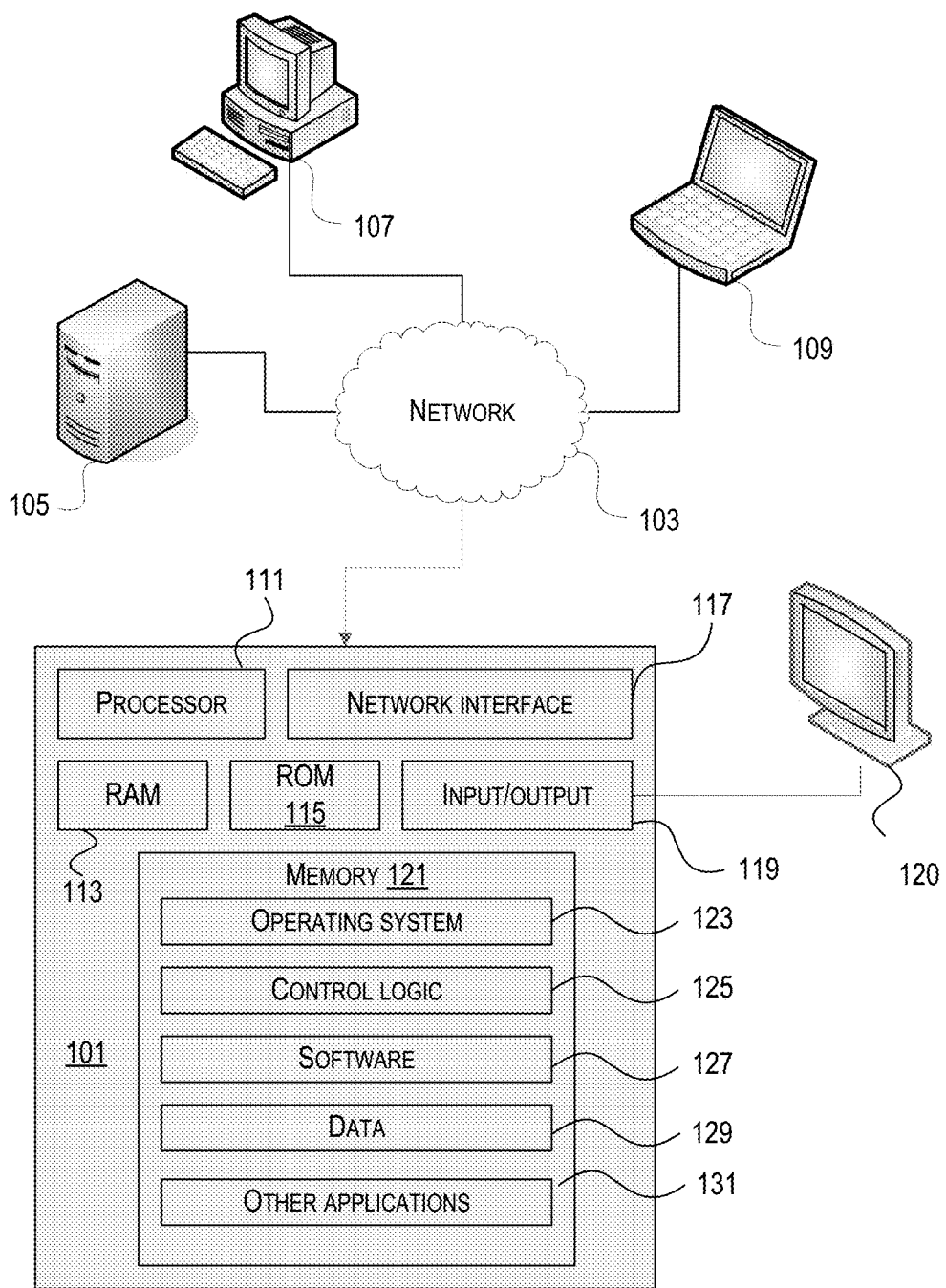
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for modifying search results for a device to reflect usage of device features over time by the user. Interactions with a first device of a first type by the user may be observed over a period of time. The observed interactions may be used to determine features of the first device that the user uses frequently. The features of the first device that the user uses frequently may be considered important to the user. When the user wishes to purchase a new device of the same type, the user may be provided with initial device search results from a recommendation engine. The initial device search results may include devices that do not include features considered important to the user. The initial device search results may therefore be modified to remove such devices, such that results presented to the user include devices that each include features of interest to the user. The user may more quickly and efficiently identify a suitable replacement device as the user can confidently select a device from the modified results knowing it includes all features considered important to the user. In this manner, the modified search results include devices that are best matched to the user. The modified search results may also include recommendation for features that the user may find important based on the user's observed interactions and/or based on usage patterns of other users with similar devices.

Aspects described herein improve the functioning of computers by improving the way in which computing devices filter and provide output to users. Conventional computing devices provide output, such as search results, in a manner which is often ill-tailored to the user. As such, significant computational resources are wasted providing users with unhelpful output. This, additionally, forces users to manually sift through computer output, which itself can be quite time-consuming By learning about user interactions and leveraging these interactions to, e.g., pre-filter search results, computing devices can provide more helpful, less computationally wasteful resources. Over time, the processes described herein can save processing time, network bandwidth, and other computing resources. Moreover, such improvement cannot be performed by a human being: by the time computer output (e.g., search results) is provided to a user, the computational resources have already been wasted.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may implement one or more aspects of the disclosure by reading and/or executing instructions and performing one or more actions based on the instructions. The computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to various examples for observing a user's interaction with a device over a period of time.

Figure 2:
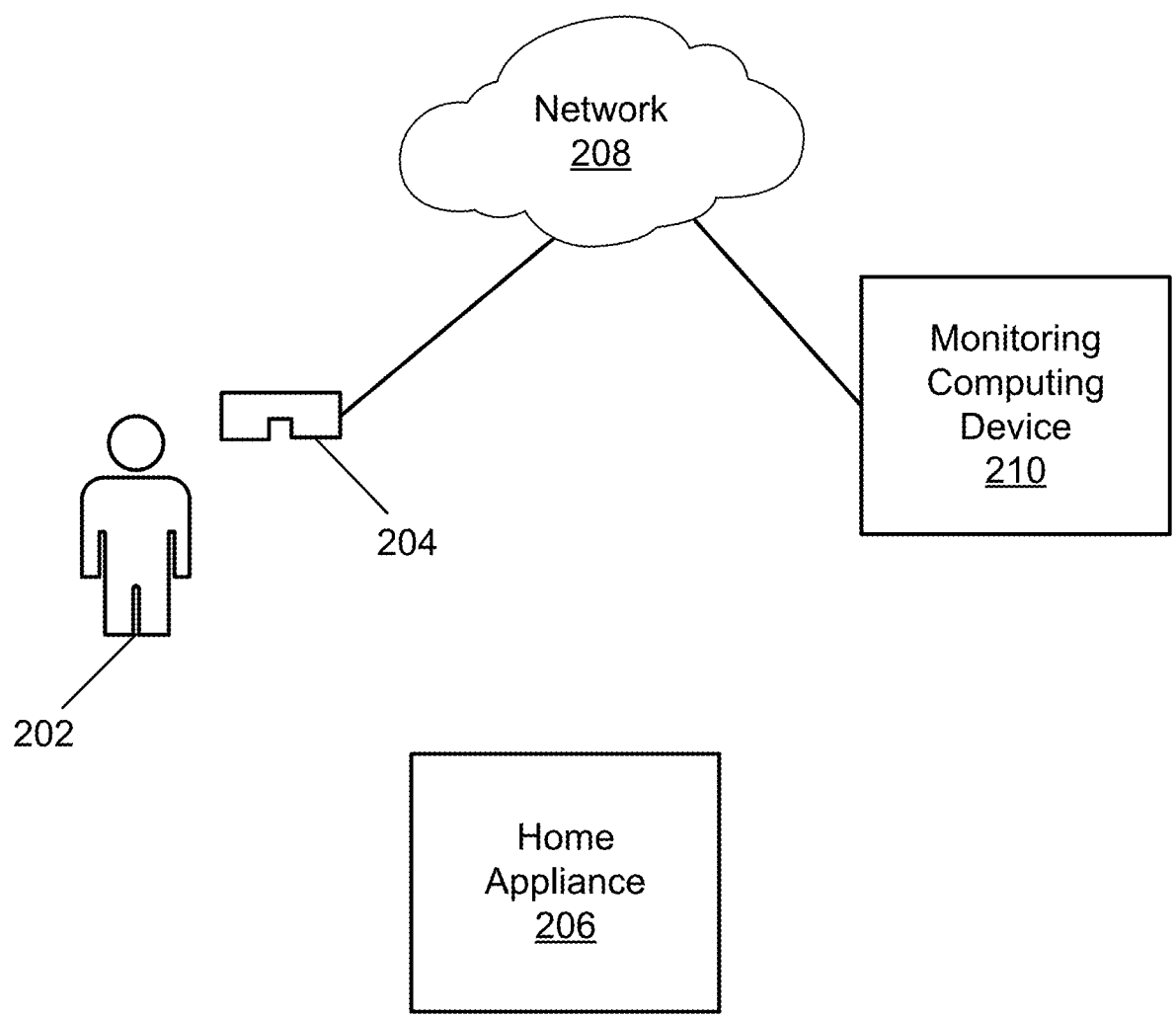
FIG. 2 illustrates a first system for monitoring user interaction with a device in accordance with one or more aspects described herein.

FIG. 2 illustrates a first system 200 for monitoring user interaction with a device in accordance with one or more aspects described herein. The system 200 may include a user 202, an extended reality (XR) device 204 (e.g., an augmented reality (AR), mixed reality (MR), and/or virtual reality (VR) device), a home appliance 206, a network 208, and a monitoring computing device 210.

The user 202 may interact with one or more devices (e.g., the XR device 204, the home appliance 206) in any type of environment. The environment may be any type of environment such as, for example, a home environment or a work environment (e.g., an office, a store, or a factory). The home appliance 206 may be any type of device including, for example, a computing device (a desktop, a laptop, a tablet, a smartphone), a television, a washing machine, a thermostat, a dishwasher, and/or a microwave. In various embodiments, the home appliance 206 may be an Internet-of-Things (IoT) device and/or may be a networked device coupled to one or more networks and/or one or more remote computing devices (e.g., a remote server). As such, while not depicted in FIG. 2, the home appliance 206 may be communicatively connected to the network 208.

The user 202 may interact with the home appliance 206. The user 202 may interact with the home appliance 206 to adjust an operation, configuration, or setting of the home appliance 206. For example, if the home appliance 206 comprises an oven, then the oven might be turned on, a temperature of the oven might be adjusted, a light in the oven might be turned on, or the like. The user 202 may interact with the home appliance 206 by manually or physically adjusting operation of the home appliance 206. For example, the user 202 may interact with the home appliance 206 by manually or physically adjusting a physical component of the home appliance 206 such as, for example, a button, a toggle, or a switch. For instance, where the home appliance 206 comprises a stove, the user 202 might flip a switch to turn on the stove. The user 202 may also interact with a user interface of the home appliance 206 by, for example, touching or otherwise physically manipulating a user interface component of the home appliance 206 (e.g., touching a touchscreen). For example, in the example where the home appliance 206 comprises a stove, the user 202 might use a touchscreen to adjust a temperature of the stove.

The system 200 may provide monitoring of interactions, by the user 202, with the home appliance 206. By monitoring the interaction of the user 202 with the home appliance 206, the system 200 may determine what features of the home appliance 206 are used by the user 202. In this manner, usage habits of the user 202 with respect to the home appliance 206 may be determined. For example, if a user uses a first feature of the home appliance 206 but never uses a second feature of the home appliance 206, then the second feature might be considered relatively unimportant to the user 202. The system 200 may monitor the interaction of the user 202 with the home appliance 206 using one or more computing devices, such as the XR device 204.

The XR device 204 may be any type of XR device including, for example, smart glasses, goggles, or a head-mounted XR device. The XR device 204 might comprise or be supported by any computing device described in relation to FIG. 1. For example, the XR device might comprise an on-board computing device, and/or might use one or more externally located support computing device (e.g., connected via Universal Serial Bus (USB)) to perform one or more computational steps as part of providing an XR environment to a user. The XR device 204 may be capable of storing any type of video and/or audio data. The XR device 204 may record and/or store video and/or audio data of the user 202 interacting with the home appliance 206. The XR device 204 may be any device that may observe one or more interactions, of the user 202, with the home appliance 206 and may store information related to any such observed interaction. The observed interaction may be a physical or manual manipulation of the home appliance 206. The manipulation of the home appliance 206 by the user 202 may involve interacting with one or more features of the home appliance 206. For example, a user might manipulate one or more operating parameters of the home appliance 206, might physically move (e.g., open a portion of) the home appliance 206, or the like. For example, if the home appliance 206 is a dishwasher, then the user might open a door of the home appliance 206, insert dishes, insert dishwashing liquid into a reservoir, close the door, and then start one or more different wash cycles. Accordingly, by observing the interaction of the user 202 with the home appliance 206, one or more features of the home appliance 206 that are used by the user 202 may be determined. As an example, if the home appliance 206 is a microwave, the user 202 might frequently use a cook function, but rarely (or never) use a defrost function.

In various embodiments, the XR device 204 may store information related to the interaction of the user 202 with the home appliance 206. The XR device 204 may store video and/or audio data relating to the user 202 interacting with the home appliance 206. For example, the XR device 204 may record video of the user 202 adjusting one or more buttons, switches, settings, or features of the home appliance 206. The XR device 204 may observe and store information related to the interaction of the user 202 with the home appliance 206 over any period of time. For example, the XR device 204 may monitor interactions, by the user 202, with the home appliance 206 over the span of any period of time such as, for example, a week, a month, or any other period of time such as the lifetime of the home appliance 206. The XR device 204 may visually observe interaction by the user 202 with the home appliance 206. For example, the XR device 204 may record video and/or audio that corresponds to the user 202 selecting a delay start button or other feature of the home appliance 206. In this manner, the XR device 204 may store information related to what features or capabilities of the home appliance 206 are used by the user 202.

The XR device 204 may be communicatively coupled to the monitoring computing device 210 via the network 208. Additionally, and/or alternatively, the user computing device 204 might be directly communicatively connected to the monitoring computing device 210, and/or the devices might be the same. The network 208 may represent one more networks that provide communications between the XR device 204 and the monitoring computing device 210. The network 208 may be any type of communications and/or computer network and may represent any number of communications and/or computer networks. The network 208 may include any type of communication mediums and/or may be based on any type of communication standards or protocols. The network 208 may be the same or similar as the network 103 FIG. 1. The network 208 communicatively couples the user computing device 204 with the monitoring computing device 210.

The monitoring computing device 210 may be any type of computing device including any computing device described in relation to FIG. 1. The monitoring computing device 210 may represent one or more computing devices, and may include one or more computers, servers, and/or databases. For example, the monitoring computing device 210 may comprise a network of servers, such as may be provided by a cloud hosting provider. The monitoring computing device 210 may represent a database or data store for storing information related to and/or indicating interaction of the user 202 with the home appliance 206. As an example, the monitoring computing device 210 may store video and/or audio data (e.g., as collected by the XR 204) of the interaction of the user 202 with the home appliance 206. Data or other information stored by the XR device 204 indicating interaction of the user 202 with the home appliance 206 may be transmitted to the monitoring computing device 210 from the XR device 204. In this manner, the interaction of the user 202 with the home appliance 206 over time may be stored by the monitoring computing device 210, such that the monitoring computing device 210 may determine a history of interaction with the home appliance 206 over time. The monitoring computing device 210 may be located remote from the operating environment of the user 202 and the home appliance 206. For example, the monitoring computing device 210 may be a network of servers located in a different country as compared to the user 202.

During interaction with the home appliance 206 by the user 202, the XR device 204 may store information relating to the home appliance 206 including, for example, a manufacturer of the home appliance 206 and/or a model number of the home appliance 206. In doing so, the monitoring computing device 210 may determine the make and model of the home appliance 206. Further, the XR device 204 may store information relating to various features, options, settings, and/or capabilities of the home device 206 based on the user 202 interacting with the home appliance 206 (e.g., by physically interacting with the home appliance 206). For example, the monitoring computing device 210 might store a serial number of the home appliance 206, a model number of the home appliance 206, an indication of one or more operating parameters of the home appliance 206, or the like.

The system 200 may be all or portions of a system for monitoring user interaction with a device based on an XR device 204. The XR device 204 may be worn by the user 202. In various embodiments, the XR device 204 may be a headset or eyeglasses or other type of wearable eye or head gear.

Discussion will now turn to a different example of how user interaction might be monitored, focusing in particular on the monitoring of audio related to control of home appliances.

Figure 3:
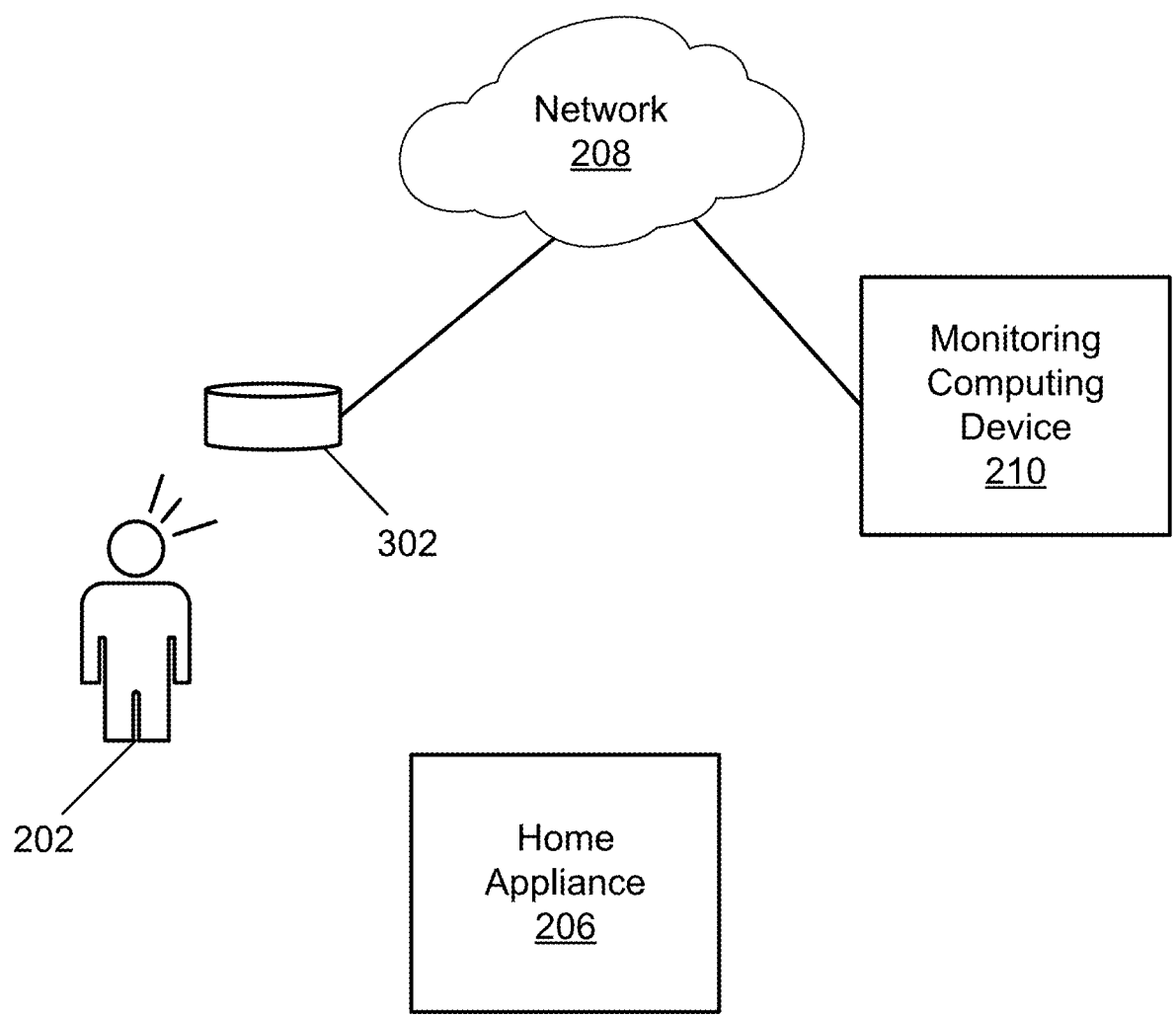
FIG. 3 illustrates a second system for monitoring user interaction with a device in accordance with one or more aspects described herein.

FIG. 3 illustrates a system 300 for monitoring user interaction with a device in accordance with one or more aspects described herein. The system 300 may include many elements which are the same and/or similar to the elements discussed with respect to FIG. 2, such as the user 202, the home appliance 206, the network 208, and the monitoring computing device 210. FIG. 3 also shows a listening computing device 302. As with the first system 200, the system 300 also operates to observe interactions of the user 202 with the home appliance 206 to determine what features of the home appliance 206 are available and used by the user 202 over a period of time.

The listening computing device 302 may be any type of listening device and may be used to control one or more devices within any type of environment. For example, the listening computing device 302 might be a smart speaker and/or a similar smart device configured to receive voice commands from the user 202. As with the system 200, the user 202 in the system 300 may interact with the home appliance 206. The listening computing device 302 may store data (e.g., audio data or other information) indicating the interaction of the user 202 with the home appliance 206. The stored data might indicate one or more sounds indicative of control of the home appliance 206. As an example, the listening computing device 302 may store audio information related to the user 202 issuing a verbal command to the home appliance 206 (e.g., "dishwasher—start wash cycle in one hour"). As another example, the listening computing device 302 may store audio information relating to the user 202 manually configuring the home appliance 206 (e.g., such that the audio information is a recording of sounds made by the home appliance 206, such as the sound of a button of the home appliance 206 being pushed). The listening computing device 302 may store any data indicating the interaction of the user 202 with the home appliance 206.

The listening computing device 302 may be communicatively coupled to the monitoring computing device 210, e.g., via the network 208. Additionally, and/or alternatively, the listening computing device 302 might be directly communicatively connected to the monitoring computing device 210. Data or other information stored by the listening computing device 302 (e.g., indicating interaction of the user 202 with the home appliance 206) may be transmitted, by the listening computing device 302, to the monitoring computing device 210.

The listening device 302 may observe interaction of the user 202 with the home appliance 206 either directly or indirectly. As an example, the listening computing device 302 may be networked or otherwise communicatively coupled to the home appliance 206 and may be configured to control operation of the home appliance 206 based on verbal commands form the user 202. Commands (e.g., verbal commands) issued by the user 202 to the listening computing device 302 (e.g., those intended to result in controlling operation of the home appliance 206) may be stored by the listening computing device 302. Additionally, and/or alternatively, information indicating the verbal commands (e.g., summaries of past verbal commands) might be stored by the listening computing device 302. As another example, the listening computing device 302 may overhear direct verbal commands issued directly to the home appliance 206 by the user 202. Under either scenario, the listening computing device 302 may detect the interaction of the user 202 with the home appliance 206.

As with the system 200, by observing the interaction of the user 202 with the home appliance 206, one or more features of the home appliance 206 that are used by the user 202 may be determined. Over time, historical data indicating features of the home appliance 206 used by the user 202 may be determined. Information relating to the interaction of the user 202 may be provided and stored by the monitoring computing device 208.

Discussion will now turn to a different example of how user interaction might be monitored, focusing in particular on the monitoring of control of home appliances using user computing devices.

Figure 4:
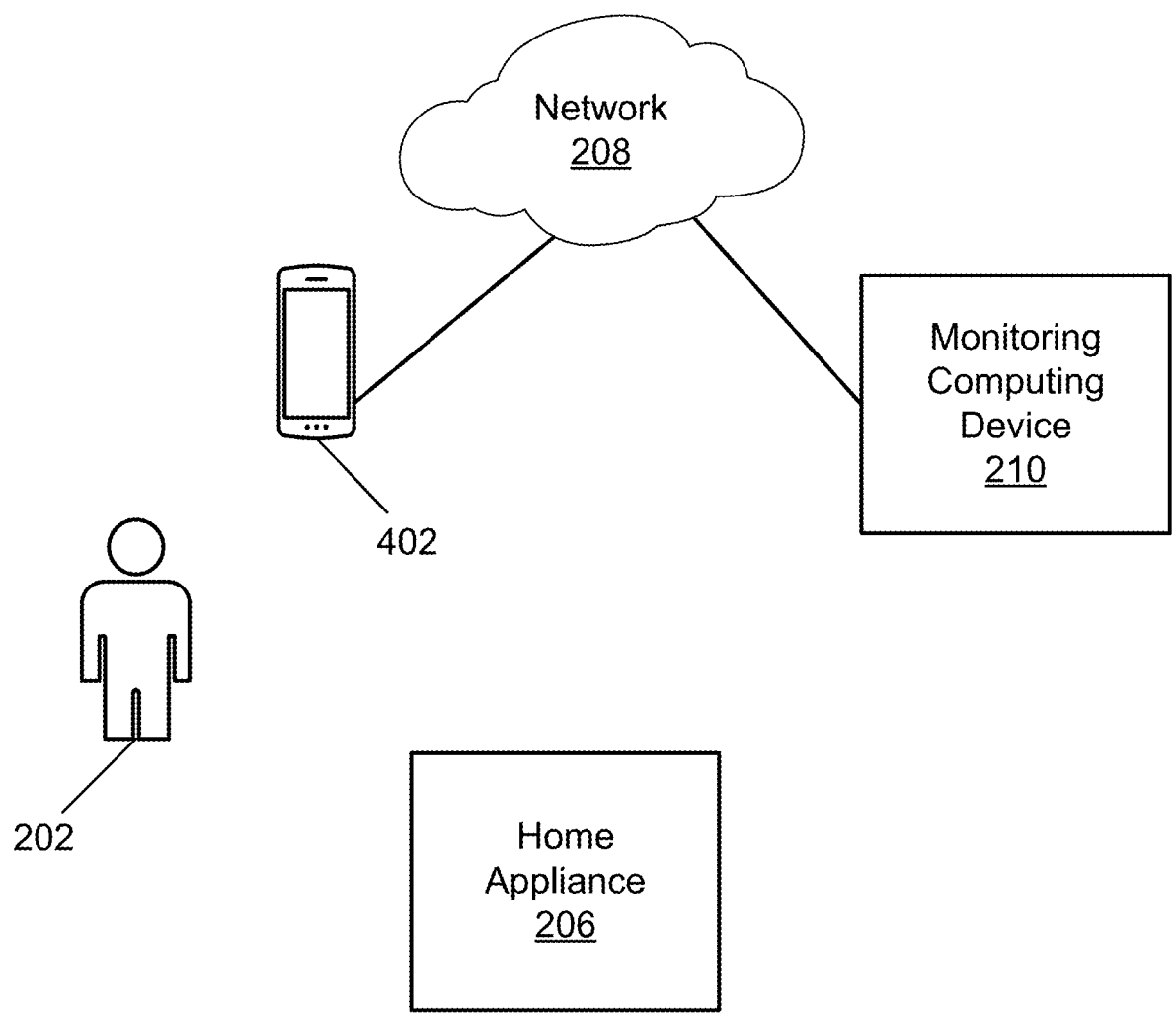
FIG. 4 illustrates a third system for monitoring user interaction with a device in accordance with one or more aspects described herein.

FIG. 4 illustrates a system 400 for monitoring user interaction with a device in accordance with one or more aspects described herein. As with the system 200 and the system 300, the system 400 includes the user 202, the home appliance 206, the network 208, and the monitoring computing device 210. The system 400 further includes a user computing device 402. As with the systems 200 and 300, the third system 400 also operates to observe interactions of the user 202 with the home appliance 206 to determine what features of the home appliance 206 are available and used by the user 202 over a period of time.

The user computing device 402 may be any type of computing device, including any computing device described in relation to FIG. 1. In various embodiments, the user computing device 402 may be, for example, a smartphone, a laptop, and/or a tablet. The user computing device 402 may additionally and/or alternatively be a portable wireless device. As an example, the user computing device 402 may be a smartphone that the user 202 may use to control the home appliance 206. That said, the user computing device 402 need not be a device specifically configured to control the home appliance 206.

The user computing device 402 may be communicatively coupled to the monitoring computing device 210 via the network 208. The user computing device 402 may additionally and/or alternatively be directly communicatively connected to the monitoring computing device 210, and/or the two devices may be the same. The user computing device 402 may store an application (e.g., an app) or other program for issuing commands to the home appliance 206 (e.g., application program interface (API) calls). The user computing device 402 may also store an app used to monitor commands issued by the user 202 including, for example, audible commands issued by the user 202 or physical commands issued by the user 202. The user computing device 402 (and/or the home appliance 206 or monitoring computing device 210) may store information relating to any commands or instructions issued to home appliance 206 from the user computing device 402 (e.g., the API calls). Stored information relating to any commands or instructions issued to home appliance 206 from the user computing device 402 may then be transmitted from the user computing device 402 to the monitoring computing device 210. The user computing device 402 may also store recorded audio or video data related to control of the home appliance 206.

The user computing device 402 may be used to control the home appliance 206 via commands issued over the network 208. A command from the user computing device 402 may be issued directly to the home appliance 206 or may be routed through a remote computing device (e.g., through a third-party computing device, server, or service for interacting with the home appliance 206). Interaction of the user 202 with the home appliance 206 may be observed and information indicating such interaction may be determined and stored.

As with the first and second systems 200 and 300, by observing the interaction of the user 202 with the home appliance 206, one or more features of the home appliance 206 that are used by the user 202 may be determined. Over time, historical data indicating features of the home appliance 206 used by the user 202 may be determined. Information relating to the interaction of the user 202 may be provided and stored by the monitoring computing device 208.

Discussion will now turn to a different example of how user interaction might be monitored, focusing in particular on the monitoring of control of home appliances through third-party system or computing devices.

Figure 5:
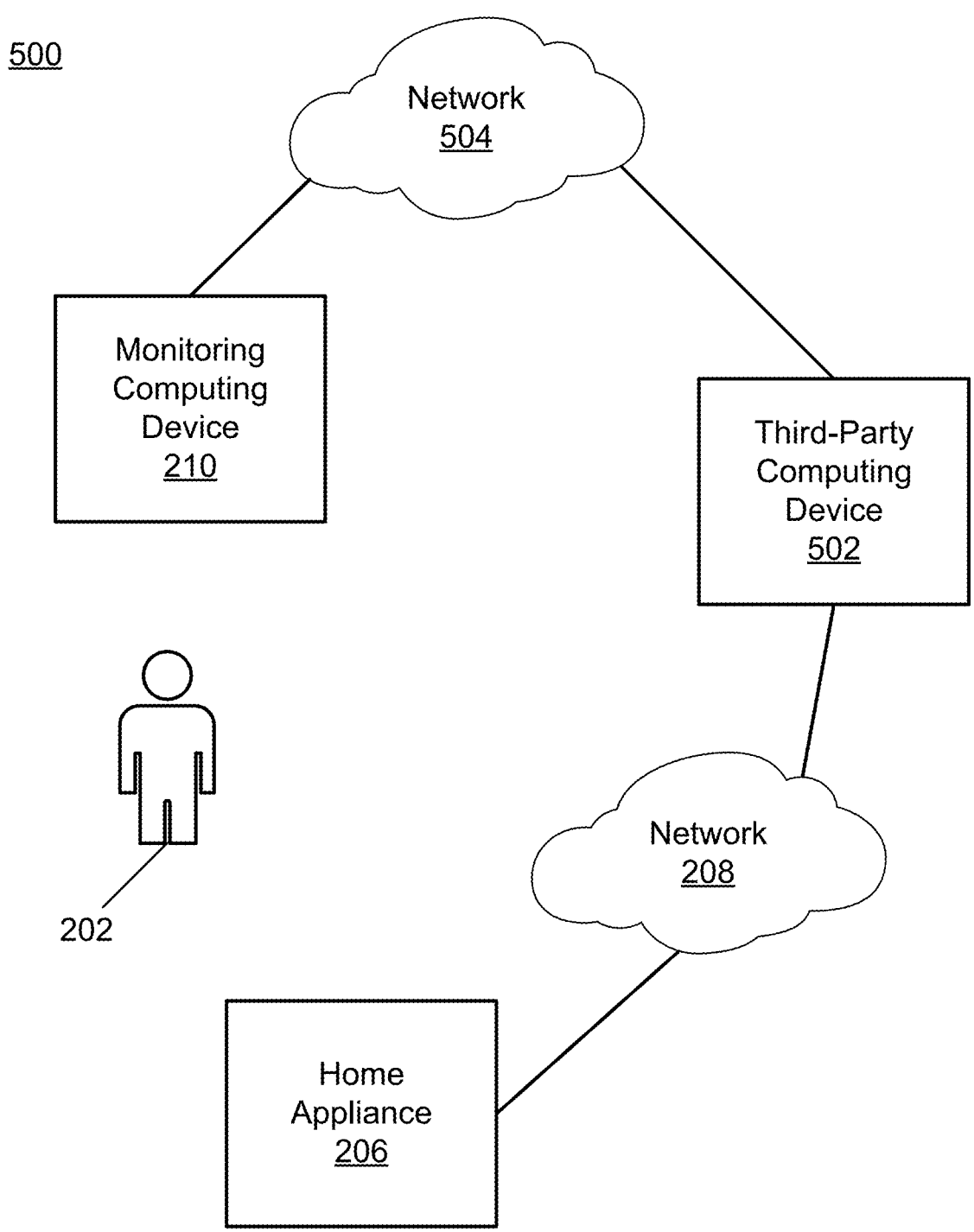
FIG. 5 illustrates a fourth system for monitoring user interaction with a device in accordance with one or more aspects described herein.

FIG. 5 illustrates a system 500 for monitoring user interaction with a device in accordance with one or more aspects described herein. Like the systems 200, 300, and 400, the system 500 may include the user 202, the home appliance 206, the network 208, and the monitoring computing device 210. The system 500 may additionally comprise a third-party computing device 502 and a second network 504. As with the systems 200, 300, and 400, the system 500 also operates to observe interactions of the user 202 with the home appliance 206 to determine what features of the home appliance 206 are available and used by the user 202 over a period of time.

The home appliance 206 may be an IoT device. In various embodiments, the home appliance 206 may be communicatively coupled to the third-party computing device 502 over the network 208. The third-party computing device 502 may be any type of computing device including any computing device described in relation to FIG. 1. The third-party computing device 502 may be a third-party computing device associated with the home appliance 206 and or may be a third-party computing device associated with a service provider that monitors devices associated with an environment. The third-party computing device 502 may represent one or more computing devices and/or a computer network associated with the third-party. In various embodiments, the third-party computing device 502 may include one or more computers, servers, and/or databases.

The home appliance 206, for example as an IoT device, may notify the third-party computing device 502 of any operation of the home appliance 206. As an example, the home appliance 206 may communicate to the third-party computing device 502 of any change in operation or any received instruction or command it may receive from the user 202. In this manner, the third-party computing device 502 may receive and store information relating to any selected features of the home appliance 206 or any use of the home appliance 206. In various embodiments, the user 202 may control the home appliance 206 directly—for example, by way of direct physical input (e.g., selecting or toggling a switch or button or interfacing with a user interface).

The user 202 may control the home appliance 206 indirectly. For example, by way of interfacing with an XR device (e.g., the XR device 204 of FIG. 2), a listening device (e.g., the listening device 302 of FIG. 3), and/or a smartphone (e.g., the smartphone 402 of FIG. 4). Control of the home appliance 206 by the user 202 either directly or indirectly may result in the home appliance 206 providing information to the third-party computing device 502 relating to any operation of the home appliance 206 (e.g., a changed setting, a selected feature, a mode of operation, etc.).

Information received by the third-party computing device 502 regarding operation of the home appliance 206 may be provided to the monitoring computing device 210 via the network 504. The network 504 may represent one more networks that provide communications between the third-party computing device 502 and the monitoring computing device 210. The network 504 may be any type of communications and/or computer network and may represent any number of communications and/or computer networks. The network 504 may include any type of communication mediums and/or may be based on any type of communication standards or protocols. The network 504 may represent an instance of the network 103 FIG. 1. The network 504 communicatively couples the third-party computing device 204 with the monitoring computing device 210.

As with the systems 200, 300, and 400, by observing the interaction of the user 202 with the home appliance 206, one or more features of the home appliance 206 that are used by the user 202 may be determined. Over time, historical data indicating features of the home appliance 206 used by the user 202 may be determined. Information relating to the interaction of the user 202 may be provided and stored by the monitoring computing device 208.

In various embodiments, any of the systems 200, 300, and 400 may also include a third-party computing device (e.g., third-party computing device 502) that may be involved in issuing commands to the home appliance 206 and/or receiving and storing information indicating features of the home appliance 206 used by the user 202. Each of the systems 200, 300, 400, and 500 enable information to be stored or collected that indicates features of the home appliance 206 that are used by the user 202. Further, other information regarding the home appliance 206 may also be stored. For example, features not used by the user 202, the make of the home appliance 206, the model of the home appliance 206, and the like may be stored.

Information indicating how the home appliance 206 is used by various different users may be collected or stored such that a profile of use of the home appliance 206 may be generated based on different user interactions. Overall, the systems 200, 300, 400, and 500 enable information on the home appliance 206 to be collected or stored that may indicate how the home appliance 206 is used and by whom, and in particular, what features of the home appliance 206 are used and which features of the home appliance 206 are not used, over any period of time. For example, the systems 200, 300, 400, and 500 may detect interaction with the home appliance 206 by any number of users and may distinguish how each user interacts with the home appliance 206.

In various embodiments, this information may be considered to be historical feature usage information (e.g., information collected and stored by any of the components depicted in systems 200, 300, 400, and/or 500 for one or more users might be collected as historical feature usage information). As described herein, this historical feature usage information may be used to filter shopping results of an individual wishing to replace the home appliance 206. Any one or more of the systems 200, 300, 400, and 500 may be used to observe a user's interactions with a device or product. The user's interactions with the device may be used to determine information relating to the device including, for example, the manufacture of the device and/or the model of the device (e.g., the make and/or model of the device). A set of features (e.g., configurations, operational modes, device characteristic, device option, etc.) for the device may be determined. For each determined feature of the device, information relating to how often and/or how many times the user interacts with a particular feature may be determined. In this manner, a determination of frequently used features (e.g., features considered important to the user) may be determined along with a determination of infrequently used features (e.g., features considered unimportant to the user) may be determined. These determinations may then be used to modify search results for a device. These determinations may be made based on tracking a count of a number of times a particular feature is used by the user (e.g., a number of time the user engages a feature, a number of times the user directs a device to operate in a particular manner, a number of times the user specifies or instructs the device to operate in a particular manner or with a particular configuration, etc.).

Discussion will now turn to functional descriptions of the operations performed by one or more components for the systems 200, 300, 400, and/or 500 for implementing the user interaction monitoring and filtering of search results as described herein.

Figure 6:
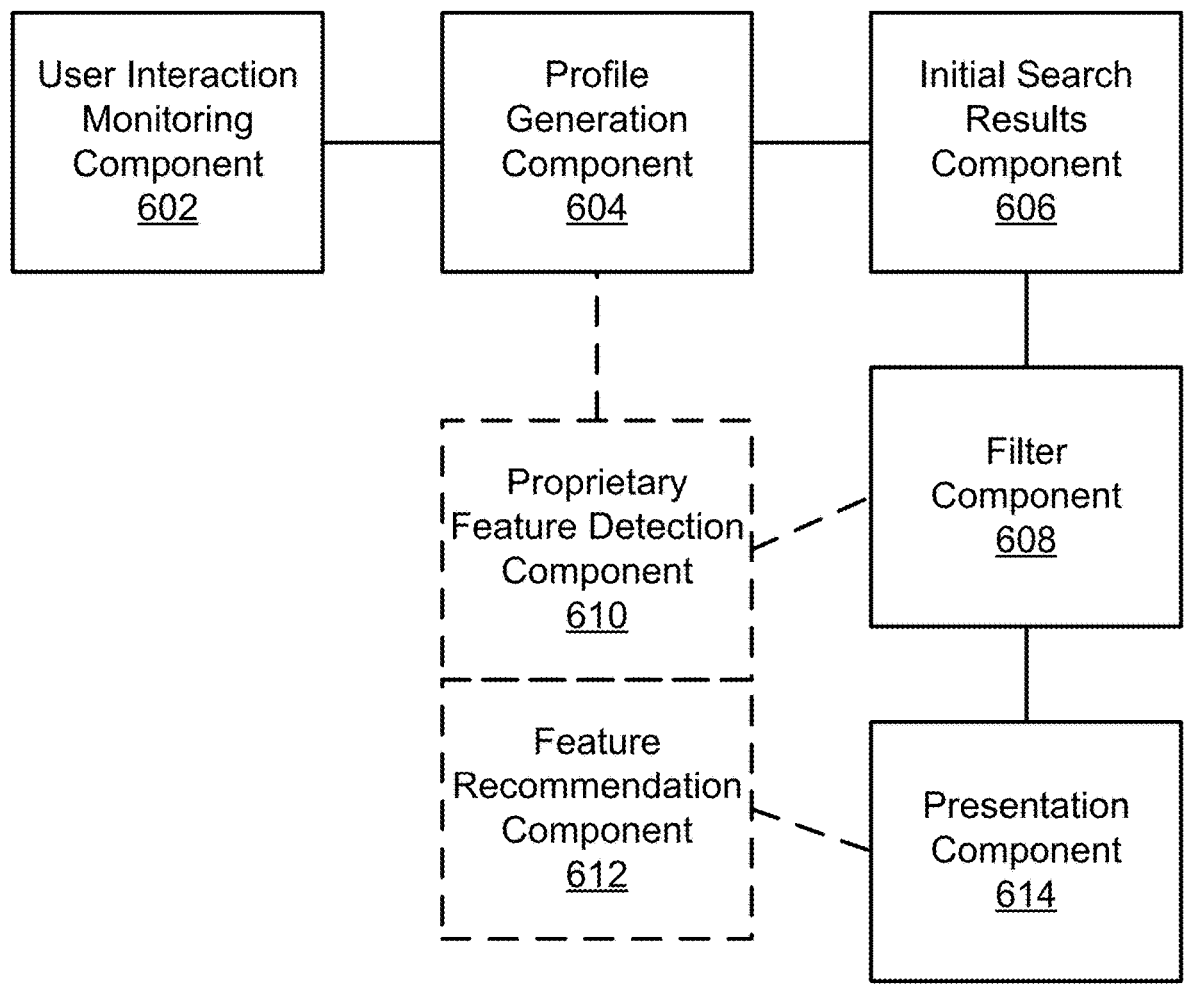
FIG. 6 illustrates a system for modifying recommendations from a recommendation engine based on historic feature usage information for a device in accordance with one or more aspects described herein.

FIG. 6 which illustrates a system 600 for modifying recommendations from a recommendation engine based on historic feature usage information for a device in accordance with one or more aspects described herein. In various embodiments, recommendations from a recommendation engine (e.g., a product search engine or other search results engine) may be modified (e.g., filtered and/or prioritized) based on information indicating what features of a device have been used by a user or group of users over a period of time. The recommendation engine may be operated by a third-party.

The recommendation engine may be used by a user to shop for a device (e.g., a replacement to the home appliance 206). Initial results from the recommendation engine may be modified to indicate to the user what products or devices from the initial results include the features the user actually needs or uses, thereby improving the shopping experience of the user. For example, by modifying initial product search results to only include products that include features used by the user (e.g., and therefore considered important or valuable to the user) based on historical interactions with a prior device by the user, the user may more quickly and efficiently identify a suitable replacement device.

In various embodiments, the system 600 may include various functional components as shown to improve a user's experience in shopping for a replacement product or device. The system 600 may improve the user's experience by presenting the user with replacement devices that include features commonly used or highly valued by the user. The system 600 may determine features commonly used or highly valued by the user by observing or monitoring the user's interaction with an initial product (e.g., the product that the user is replacing) over a period of time. The functional components shown in FIG. 6 may be implemented by any one or more of the devices or components depicted in FIGS. 1-5. The functional components shown in FIG. 6 may be implemented in hardware, software, or any combination thereof. The functional components depicted in FIG. 6 may be implemented by the monitoring computing device 210.

As shown in FIG. 6, the system 600 may include a user interaction monitoring component 602, a profile generation component 604, an initial search results component 606, a filter component 608, and a presentation component 614. The system 600 may also include a proprietary feature detection component 610 and a feature recommendation component 612.

The user interaction monitoring component 602 may observe a user's interaction with a device over a period of time. The device may be any type of product or component as described herein, such as the home appliance 206. The user interaction monitoring component 602 may include one or more components for monitoring the user's interaction with a device. For example, the user interaction monitoring component 602 may include or be a component of the XR device 204 of FIG. 2, the listening device 302 of FIG. 3, the user computing device 402 of FIG. 4, and/or the third-party computing device 502 of FIG. 5. In general, the user interaction monitoring component 602 may include any number of devices and/or any type of device or component for observing a user's interaction with a device and collecting data indicating the user's interaction with the device.

The user interaction monitoring component 602 may additionally and/or alternatively include one or more components for storing any information relating to or indicating the user's interaction with a device—for example, the monitoring computing device 210 and/or the third-party computing device 502. The user interaction monitoring component 602 may also interact with any network that may facilitate communications between any device used to observe the user's interaction with a device and any component used to store any information relating to or indicating the user's interaction with any device (e.g., the network 208 and/or the network 504).

The user interaction monitoring component 602 may observe and collect (e.g., monitor) the user's interaction with a device over any period of time. The user interaction monitoring component 602 may observe and collect interaction with a device by any user or group of users (e.g., all members of a household or all members of an office). The user interaction monitoring component 602 may store information relating to interaction with a device by each user separately or collectively. That is, in various embodiments, the user interaction monitoring component 602 may store information identifying a particular user that interacted with the device in a particular manner.

The device profile generation component 604 may receive information from the user interaction monitoring component 602. The device profile generation component 604 may generate a profile of the device based on the user's interaction with the device (e.g., based on data stored by the user interaction monitoring component 602). The profile may indicate how the user interacts with the device and may indicate what features are commonly used by the user or highly valued by the user (e.g., based on a frequency of use of a feature by the user). In various embodiments, the profile may indicate one or more features that the user frequently uses. For example, the profile may be generated based on a count of a number of times a feature is used by the user and/or by maintaining an amount of time between the user interacting with a particular feature of the device. The profile may indicate one or more features that are used by the user a number of times more than a predetermined usage threshold.

The profile may also indicate one or more features that are not commonly used or infrequently used by the user. The profile may indicate one or more features that are used by the user a number of times less than a predetermined usage threshold. In this manner, the profile may indicate what features, settings, or configurations of the device are highly valued by the user (e.g., based on a number of times the feature is used and/or an amount of time between uses of the feature). Accordingly, the profile of the product may be used to extract important features and unimportant features of the device used by the user.

As an example, the device may be a dishwasher. The profile for the dishwasher may indicate that the user has used the delay start feature of the dishwasher a number of times that exceeds a predetermined usage threshold. As such, the profile may indicate that the delay start feature is an important feature to the user. In various embodiments, the profile may therefore indicate that a delay start feature is a feature that should be included in a new dishwasher that the user may wish to purchase (e.g., when the user is shopping to buy a new dishwasher or a replacement dishwasher when the original dishwasher breaks). The delay start feature may therefore be a feature that may be used to filter any initial search results when the user shops for a dishwasher (e.g., such that any dishwasher that does not include a delay start feature are removed from the modified initial search results).

The profile for the dishwasher may further indicate that the user has not used the soil sensor feature of the dishwasher a number of times that exceeds a predetermined usage threshold. That is, the profile for the dishwasher may indicate that the user has used the soil feature a number of times that is below the predetermined usage threshold. As such, the profile may indicate that the soil sensor feature is an unimportant feature to the user. In various embodiments, the profile may therefore indicate that a soil sensor feature is a feature that need not be included in a new dishwasher that the user may wish to purchase (e.g., when the user is shopping to buy a new dishwasher or a replacement dishwasher when the original dishwasher breaks). Accordingly, the soil sensor feature may therefore be a feature that may not be used to filter any initial search results when the user shops for a dishwasher.

The initial device search results component 606 may receive information indicating a set of devices or products from an initial (e.g., unfiltered) search for device or product (e.g., unfiltered). In various embodiments, the initial device search results component 606 may receive the initial search results from another device. For example, from a computing device and/or web browser that the user may use to conduct an initial search for a replacement device or product. In various embodiments, the initial device search results component 606 may be a computing device that the user interacts with to conduct the initial search for a replacement device or product. In various embodiments, the initial device search results may be provided by any type of search or recommendation engine.

The initial device search results component 606 may receive information indicating one or more devices that match a type of device that the user intends to purchase (e.g., in order to replace an existing device). As an example, if the user is seeking to buy a new dishwasher, the user may conduct a basic browser-based search for dishwasher products. Information on available dishwashers for purchase may be provided by any information source including any third-party source (e.g., a third-party manufacturer of dishwashers, a third-party retailer of dishwashers, or by some other third-party search service). As described herein, the information on available dishwashers from the initial search results may include information on many different dishwashers that may be unappealing to the user as the initial search results may not account for the user's historical feature usage of a prior dishwasher the user is seeking to replace.

A listing of devices obtained by the initial device search results component 606 may be provided to the filter initial search results component 608. The filter initial search results component 608 may review the initial device search results obtained by the initial device search results component 606 based on the profile of the device generated by the device profile generation component 604. In various embodiments, the filter initial search results component 608 may review each device identified in an initial search for a device to identify all devices that include each feature identified by the device profile as important to the user. In various embodiments, each device identified in an initial search for a device may be removed from a search results listing if the device does not include each feature identified by the device profile as important to the user.

In various embodiments, features determined to be important to the user based on the device profile may be prioritized. In doing so, the device search results may be filtered such that devices that do not include all important features but all highly prioritized important features remain. It will be appreciated by one skilled in the art that any type of feature prioritization may be determined and any filtering of results based on feature prioritization may be implemented to remove certain devices from the initial search results and/or to rank any remaining devices from the initial listing. In various embodiments, at least one device from the initial search results listing may be removed when the device does not include at least one feature determined from the device profile to be an important feature to the user. Prioritization may be determined, for example, based on a frequency of use of a particular feature as described herein in comparison to the frequency of use of another feature.

As an example, the device may be a dishwasher and the important feature may be determined to be a delay start feature based on the profile for the dishwasher. The initial search results may include a total of eight (8) dishwashers. Four (4) of the dishwashers may not include the delay start feature and four (4) of the dishwashers may include the delay start feature. In various embodiments, the filter initial search results component 608 may remove the four (4) dishwashers that do not include the delay start feature from the initial search results before the providing modified search results to the user. In this manner, the user may more efficiently and quickly identify a suitable replacement dishwasher as any dishwasher that the user is likely to not purchase is removed from the initial search results (e.g., since it does not include the delay start feature that the user wants). The search results can therefore be filtered to only provide the most relevant dishwashers to the user and to present only those dishwashers the user is likely to purchase as a replacement product. The user therefore needs not comb through a large listing of dishwashers and review long lists of features for each product as the user can be confident that the filtered search results have removed unsuitable dishwasher candidates from consideration.

In various embodiments, the system 600 may include a proprietary feature detection component 610 (shown in phantom in FIG. 6). The proprietary feature detection component 610 may review features included with each device included in the initial device feature results obtained by the initial device search results component 606. The proprietary feature detection component 610 may determine that a feature for one of the listed devices is indicated by a proprietary name (or different name) than is typical for the feature (or at least different for the name of the feature as it is known by the current device the user is replacing). The proprietary feature detection component 610 may determine a more generic name or term for the proprietary name for the feature of the identified device. The proprietary feature detection component 610 may modify the initial device feature results to identify the proprietary name of the feature as equivalent to a more generic name and/or equate it to the name of the feature with which the user is familiar.

As an example, the device may be a dishwasher and an important feature of the dishwasher to the user may be an extra rinse feature. The initial device listing may include a dishwasher that identifies an extra rinse features by a propriety name "deep fill." The proprietary feature detection component 610 may determine that the dishwasher listed as including the deep fill feature is equivalent to including an extra rinse feature. The proprietary feature detection component 610 may indicate such equivalency to the filter initial search results component 608. In turn, the filter initial search results component 608 may not remove the dishwasher that lists the deep fill feature as an included feature. In various embodiments, the filter initial search results component 608 may modify the initial search results to indicate that the proprietary name of the extra rinse feature—deep fill—is equivalent to an extra rinse feature that the user knows. In this way, the user can identify suitable replacement dishwashers or other products more quickly and efficiently by not having to research the meaning of each proprietary feature name included with a dishwasher or other device for which the user is shopping.

In various embodiments, the proprietary feature detection component 610 may also be used by the system 600 in developing a profile for the current device. As an example, the initial device used by the user that may serve as the basis for observation may include a specialized or proprietary name for a feature. The proprietary feature detection component 610 may operate to identify the feature and to equate it to a more generic name or term such that a more applicable profile (e.g., not based on proprietary feature names) for the device may be generated.

As further shown in FIG. 6, the system 600 may include a feature recommendation determination component 612 (shown in phantom in FIG. 6). In various embodiments, a listing of devices obtained by the initial device search results component 606 and/or the filter initial search results component 608 may be provided to the feature recommendation determination component 612. The feature recommendation determination component 612 may determine one or more features to recommend to the user to be included in a device the user may plan to purchase.

In various embodiments, the feature recommendation determination component 612 may determine one or more features to recommend to the user based on features the user currently values as important. In various embodiments, the feature recommendation determination component 612 may implement one or more algorithms to extrapolate what features a user may find useful. In various embodiments, the feature recommendation determination component 612 may implement a machine learning (ML) algorithm to extrapolate what features a user may find useful. In various embodiments, determination of features a user may find useful may use information from the user's own use of a similar device and/or information from other user's that may use a device of a same type as used by the user (e.g., other users that also have a dishwasher or a similar dishwasher model as the user).

In various embodiments, the feature recommendation determination component 612 may generate an indication of additional features for the user to consider that are included within devices provided within a listing of initial or filtered search results from the initial device search results component 606 and/or the filter initial search results component 608. The feature recommendation determination component 612 may review any information related to any devices and may highlight or indicate additional features included by any device for consideration.

As an example, the feature recommendation determination component 612 may be aware that a first user values the popcorn feature of a microwave. The feature recommendation determination component 612 may determine—for example, based on one or more ML algorithms or techniques—that a group of users that similarly value a popcorn setting of a microwave also value an auto-defrost feature of a microwave. Accordingly, the feature recommendation determination component 612 may recommend to the first user that the first user should consider an auto-defrost feature when shopping for a replacement microwave. Modification of the initial search results may be based on determinations made by the feature recommendation determination component 612.

The system 600 may further include a presentation component 614. The presentation component 614 may provide information regarding recommended devices to the user. In various embodiments, the presentation component 614 may provide information for devices based on outputs provided by the filter initial search results component 608 and/or the feature recommendation determination component 612. In various embodiments, the presentation component 614 may provide information relating to any recommended devices to the user via any type of computing device including any computing device described in relation to FIGS. 1-5. As an example, information relating to any recommended devices may be provided to a user's smartphone or laptop. In general, presentation component 614 may interact with one or more devices (e.g., any of the devices depicted in FIGS. 1-5) to present filtered search results to a user including any type of screen, webpage, or other data presentation device or graphical presentation system. Further, presentation to a user of the filtered search results may be through presentation in a webpage or presentation by causing display of filtered search results on a display screen.

In various embodiments, the presentation component 614 may organize and indicate how information relating any recommended device should be presented to the user. Any modification (e.g., filtering, prioritizing, highlighting, etc.) to the initial search (e.g., shopping) results may be conducted or provided. In various embodiments, the presentation component 614 may indicate that only devices that include important features to the user (e.g., as determined by the system 600 as described herein) and/or recommended features (e.g., as determined by the system 600 as described herein) should be presented to the user. Further, the presentation component 614 may indicate that the device information should be presented in a prioritized manner and/or may be presented with one or more indications (e.g., highlighting) as to the particular features included with each device such that the user may quickly and efficiently identify devices that meet the user's needs. As an example, devices may be listed in a manner that places devices having the most highly valued features for the user first for review and devices having fewer of the most valued features for secondary review.

In various embodiments, the system 600 may rely on data generated or provided using any one or more of the systems 200, 300, 400, and 500. In various embodiments, the system 600 may provide modified and/or filtered search results to a user that may be considered customized to the user. Customization may be based on accounting for how the user actually uses and interacts with a device (e.g., a current home device or appliance) and determining which features of the device are more important to the user. By modifying search result for presentation to the user, the system 600 may provide a listing of candidate devices for the user that represent the best matches to the needs of the user.

The components shown in FIG. 6 are not limited to the arrangement and coupling shown in FIG. 6. In various embodiments, the system 600 may include components communicatively coupled to one another in any manner or arrangement such that data provided or generated by any one component may be provided to any other component.

Discuss will now turn to example methods for filtering search results based on the operation of any of the systems 200, 300, 400, 500, and/or 600.

Figure 7:
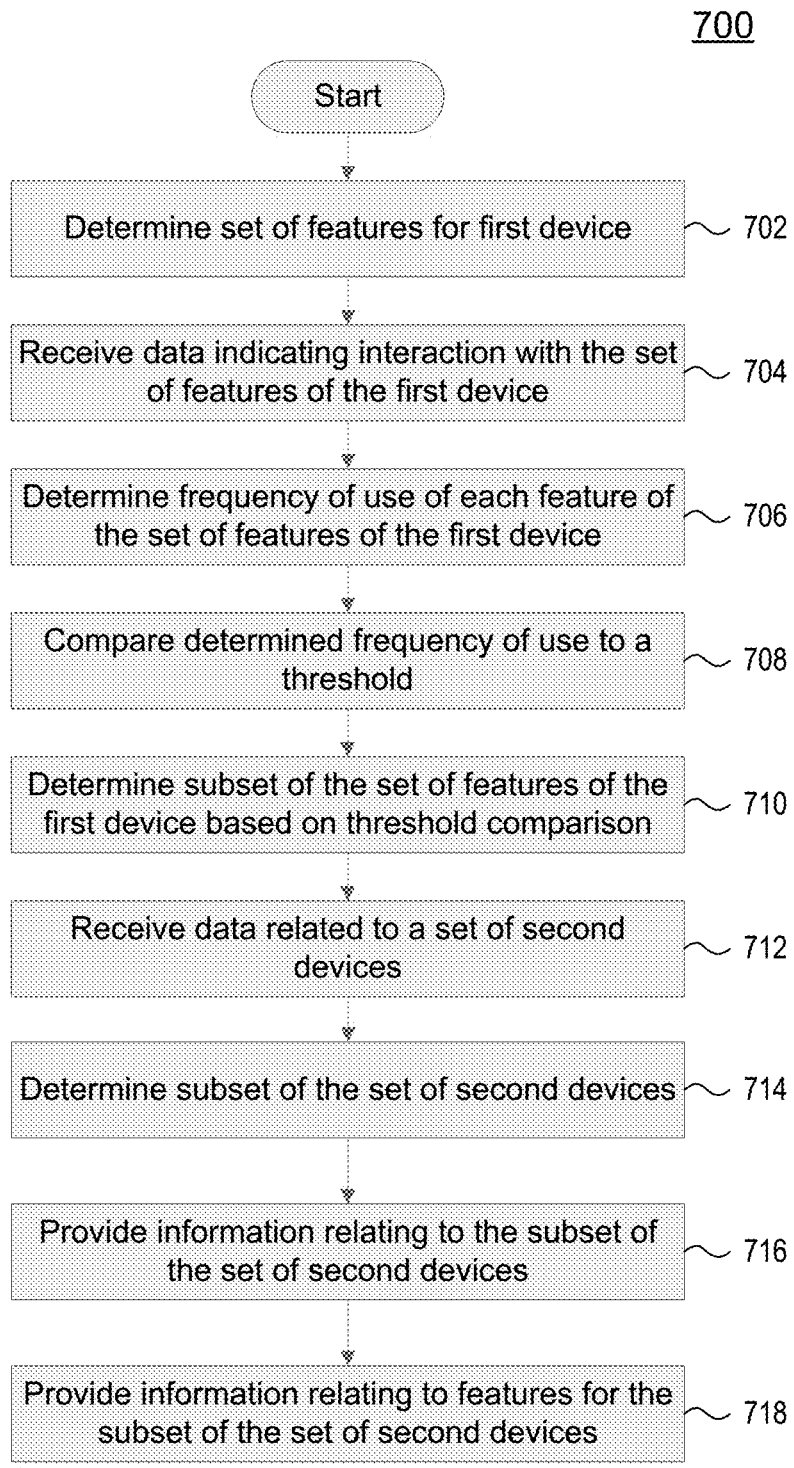
FIG. 7 depicts a flowchart for a first method for filtering shopping results for a product based on historic feature usage in accordance with one or more aspects described herein.

FIG. 7 illustrates a first example method 700 for filtering shopping results for a product based on historic feature usage in accordance with one or more aspects described herein. Method 700 may be implemented by a suitable computing system and/or any combination of computing systems or devices, as described herein. For example, method 700 may be implemented in any suitable computing environment by a computing device and/or combination of computing devices, such as computing devices 101, 105, 107, and 109 of FIG. 1 and/or by any one or more of the components depicted in any of FIGS. 1-6. Method 700 may be implemented in suitable program instructions, such as in software 127, and may operate on data, such as data 129. Method 700 may be implemented by the system 600 and/or any component thereof and may be implemented with any one or more of the components depicted in any of FIGS. 1-5.

At step 702, a set of features for a first device may be determined. The first device may be any type of device including, for example, the home appliance 206 depicted in FIGS. 2-5. The set of features for the first device may be determined based on identification of a manufacturer and/or model of the first device. In various embodiments, identification of a manufacturer and/or model of the first device may be directly provided by a user (e.g., by a user providing such information through a computing device and/or user interface) and or may be provided indirectly by observing the user's interaction with the first device (e.g., by capturing a video or an image of the first device and subsequently identifying the manufacturer and/or model of the first device). In various embodiments, at step 702, all features available and/or included with the first device may be determined.

At step 704, data indicating interaction with the set of features by a user may be received. In various embodiments, data indicating interaction with the set of features by a user may be received via any type of computing device such as the XR device 204 of FIG. 2, the listening device 302 of FIG. 3, and/or the user computing device 402 of FIG. 4. The received data may include data indicating how the user interacts with the first product. For example, data indicating what features, settings, and/or configurations of the first device the user may use or engage. The received data may be based on observations of the user interacting with the first device and data indicating such interactions may be collected over any period of time.

At 706, a frequency of use of each feature of the set of features may be determined. The frequency of use of each feature of the set of features may be based on the data indicating interaction with the set of features by a user (e.g., based on data received via step 704). In various embodiments, a count of a number of times that each feature is used by the user may be determined (e.g., tracked) over any period of time.

At 708, the determined frequency of use of each feature of the set of features may be compared to a predetermined threshold. The predetermined threshold may be a usage threshold indicating that a feature is valued by the user if the feature is used a number of times that exceeds the predetermined threshold (or meets or exceeds the predetermined threshold). The predetermined threshold may be set so as to distinguish often used features from seldom or rarely used features of the first device.

At 710, a subset of the set of features may be determined based on the comparison of step 708. In various embodiments, features that are used frequently that satisfy the predetermined threshold (e.g., meets and/or exceeds) may be considered to be important or valued features of the first device. Features that are not used frequently that have an associated count that does not satisfy the predetermined threshold (e.g., meets and/or is lower than) may be considered to be unimportant or not valued features of the first device. Accordingly, as step 710, each feature of the subset of the set of features determined via step 710 may have a frequency of use that exceeds the predetermined threshold. In various embodiments, features that are used frequently that have an associated count that satisfies the predetermined threshold may be considered to be important or valued features of the first device.

As example, the device may be a dishwasher. A first feature of the dishwasher may be a delay start feature and a second feature may be an extra rinse feature. The delay start feature may be used a first number of times over a first period of time. The extra rinse feature may be used a second number of times over the first period of time. The predetermined threshold may be set such that the first number of times meets or exceeds the predetermined threshold while the second number of times may be lower than the predetermined threshold. Accordingly, at step 710, the delay start feature may be selected and/or indicated as being within a determined subset of the features of the dishwasher, with the determined subset of features representing important or valued features of the dishwasher. The extra rinse feature may be determined to not be an important or valued feature of the dishwasher and so may not be selected and/or indicated as not to be included within the determined subset of the features of the dishwasher.

At step 712, data related to a set of second devices may be received. Each second device of the set of second devices may be of a same type as the first device. As an example, the first device may be a dishwasher and each second device of the set of second devices may also be a dishwasher. The data related to the set of second devices may be received from any computing device. In various embodiments, the data related to the set of second devices may be based on a search the user conducts for a replacement for the first device. As an example, perhaps the user's dishwasher broke or the user wants to buy a second dishwasher that is similar to the user's current dishwasher. Accordingly, the user may conduct a search for dishwashers (e.g., via search engine and/or a third-party website or other information source) and may be provided with data relating to multiple different dishwashers (e.g., dishwashers manufactured by different third-parties and/or different models of dishwashers from a third-party manufacturer). The data relating to each second device may indicate each available feature (e.g., setting, configuration, etc.) for each second device of the set of second devices.

At step 714, a subset of the set of second devices may be determined based on the subset of the set of features determined in step 710. In various embodiments, each second device of the subset of the set of second devices may include each feature of the subset of the set of features for the first device. As an example, the first device may be a dishwasher and the subset of the set of features for the dishwasher may include a delay start feature and a solid sense feature. The second devices may also all be dishwashers and the subset of the dishwashers may be determined by ensuring each of the dishwashers include both the delay start feature and the soil sense feature. Any dishwasher that does not include both the delay start feature and the soil sense feature may be excluded from the determined subset of the second set of devices. In this manner, shopping and/or search results for a device may be filtered or organized based on inclusion of high valued or important features based on the user's interaction with such features with the first device.

At step 716, information identifying each second device of the subset of the set of second devices may be provided to the user. In various embodiments, the information identifying each second device of the subset of the set of second devices may be displayed on a user interface (e.g., a user interface of a computing device such as a smartphone, tablet, or laptop).

At step 718, information indicating the availability of the subset of the set of features for each second device of the subset of the set of second devices may be provided to the user. In various embodiments, the information indicating the availability of the subset of the set of features for each second device of the subset of the set of second devices may be displayed on a user interface (e.g., a user interface of a computing device such as a smartphone, tablet, or laptop). As an example, the device of interest may be a dishwasher and information indicating that each dishwasher in the determined subset of dishwashers includes a delay-start feature and a soil sense feature may be provided to the user.

The method 700 may include or may be modified to provide recommendation of features to the user. For example, the method 700 may include determining an additional feature available to at least one second device of the subset of the set of second devices that is unavailable to the first device. A likelihood that a frequency of usage of the additional feature would exceed the predetermined threshold may be determined. The likelihood may then be compared to a second predetermined threshold. Information indicating the availability of the additional feature available to the at least one second device of the subset of the set of second devices that is unavailable to the first device when the likelihood exceeds the second predetermined threshold may then be provided to the user (e.g., via the user interface of a display device).

The method of 700 may include or may be modified to account for proprietary feature names used by a current device (used to observe the user's interactions with different features) or a candidate device that may be considered for purchase. For example, the method 700 may include determining that at least one feature of the set of features of the first device is indicated by a proprietary name. A function performed by the at least one feature of the set of features of the first device that is indicated by the proprietary name may then be determined. Subsequently, a determination that each second device of the subset of the set of second devices includes at least one feature to perform the determined function may be made. Method 800 described herein may also include or be modified to include these features of method 700—namely, identification of recommended features and/or identification of proprietary names functions to improve the user's shopping experience.

Figure 8:
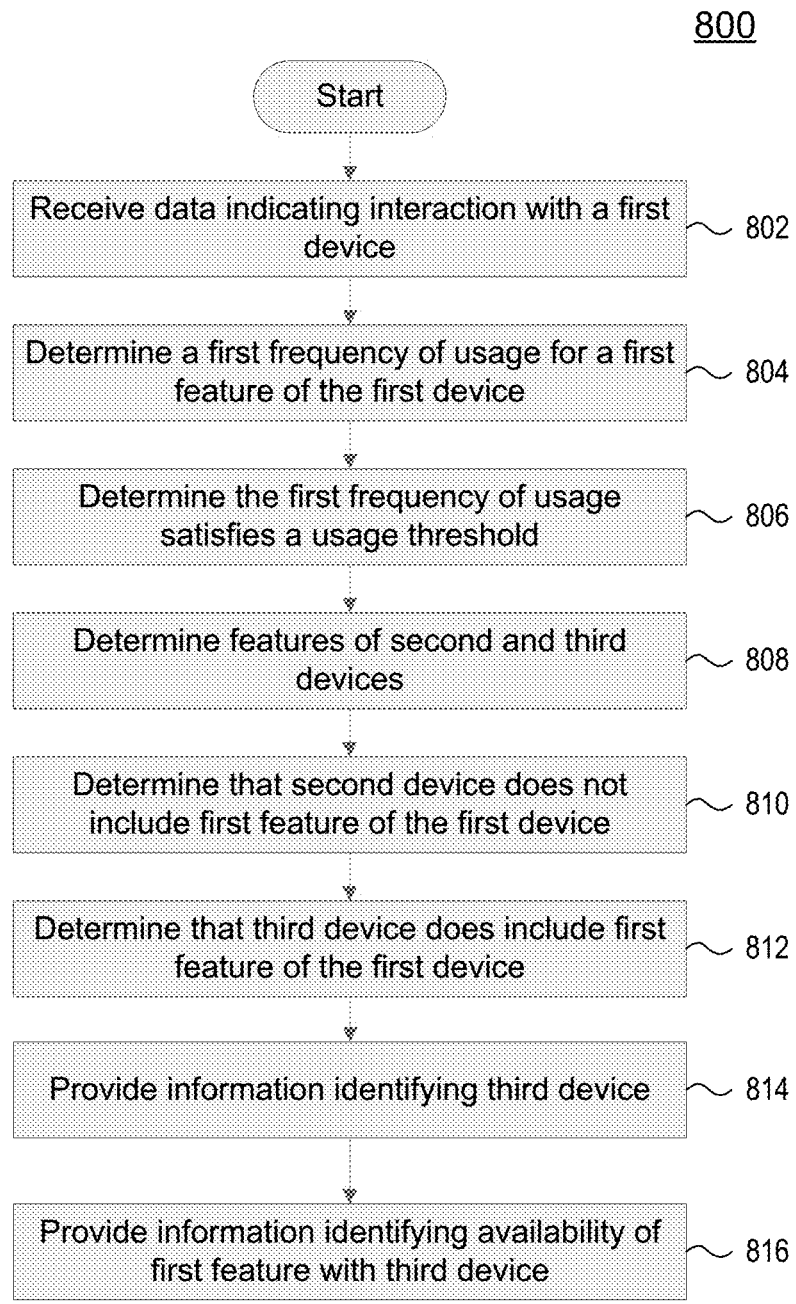
FIG. 8 depicts a flowchart for a second method for filtering shopping results for a product based on historic feature usage in accordance with one or more aspects described herein.

FIG. 8 illustrates a second example method 800 for filtering shopping results for a product based on historic feature usage in accordance with one or more aspects described herein. Method 800 may be implemented by a suitable computing system and/or any combination of computing systems or devices, as described herein. For example, method 800 may be implemented in any suitable computing environment by a computing device and/or combination of computing devices, such as computing devices 101, 105, 107, and 109 of FIG. 1 and/or by any one or more of the components depicted in any of FIGS. 1-6. Method 800 may be implemented in suitable program instructions, such as in software 127, and may operate on data, such as data 129. Method 800 may be implemented by the system 600 and/or any component thereof and may be implemented with any one or more of the components depicted in any of FIGS. 1-5.

At step 802, data indicating interaction with a first device by a user may be received. The first device may be any type of device including, for example, the home appliance 206 depicted in FIGS. 2-5. In various embodiments, data indicating interaction with the first device by the user may be received via any type of computing device such as the XR device 204 of FIG. 2, the listening device 302 of FIG. 3, and/or the user computing device 402 of FIG. 4. The received data may include data indicating how the user interacts with the first product. For example, the received data may indicate what features, settings, and/or configurations of the first device the user may use or engage. The received data may be based on observations of the user interacting with the first device and data indicating such interactions may be collected over any period of time. This step may be the same or similar as step 704 of FIG. 7.

At 804, a first frequency of usage for a first feature of the first device may be determined. The first frequency of usage for the first feature of the first device may be determined based on data received via step 802. The first feature may be any feature, setting, and/or configuration of the first device the user may use or engage. In various embodiments, the first frequency of usage for the first feature may be determined by counting or tracking a number of times the first feature is used or interacted with by the user over any period of time.

At 806, the first frequency of usage for the first feature of the first device may be determined to be higher (or greater) than a predetermined threshold. The predetermined threshold may be set to a count value. In various embodiments, the predetermined threshold may be set to a count value that indicates a threshold amount of usage indicating whether a feature is deemed important to the user (and therefore frequently used) or is deemed not important to the user (and therefore not frequently used). The first frequency of usage for the first feature of the first device may be determined to be higher (or greater) than a predetermined threshold by comparing the first frequency of usage for the first feature of the first device to the predetermined threshold. In this manner, the first feature of the first device may be determined to be a valued or important feature of the first device.

In various embodiments, the predetermined threshold may be a count value (e.g., an integer value), a percentage (e.g., based on a number of times a feature is used in comparison to a number of times the home appliance is used in total), or as a combination of both. In this manner, an indication of the importance of the feature may be determined. For example, the feature of the home appliance may be used each time the home appliance is used but perhaps the home appliance is only used a few times. Under such situation, the predetermined threshold may indicate that the importance of the feature is indeterminable based on such relatively low use of the home appliance itself.

At 808, one or more second features for a second device and one or more third features for a third device may be determined. The second device and the third device may be of a same type as the first device. For example, the first device may be a dishwasher. Accordingly, both the second and third devices may be dishwashers.

At 810, the one or more second features of the second device may be determined to not include the first feature of the first device. As an example, the first feature of the first device may be determined to be a delay start feature of a dishwasher. It may be determined that the second device does not include a delay start feature.

At 812, the one or more third features of the third device may be determined to include the first feature of the first device. As an example, the first feature of the first device may be determined to be a delay start feature of a dishwasher. It may be determined that the third device does include a delay start feature.

At 814, information identifying the third device may be provided to the user. In various embodiments, information identifying the third device may be provided on a computing device associated with the user—for example, on a user interface of a device associated with the user.

At 816, an indication that the one or more third features of the third device include the first feature of the first device may be provided to the user. In various embodiments, the indication that the one or more third features of the third device include the first feature of the first device may be provided on a computing device associated with the user—for example, on a user interface of a device associated with the user.

The techniques described herein enable a user to search and locate a product or device in a more efficient manner Conventional recommendation engines are deficient in that they do not account for the user's actual interactions with a current device. Therefore, device search results from such conventional recommendation engines are not generated based on any knowledge of what features of the current device are considered important to the user. These device search results typically include many listings of devices that do not meet the needs of the user as they fail to include the features the user considers important. By observing the user's interactions with the current device, features of the current device often used by the user may be determined and used to filter out devices from any initial search results that do not include the identified important features. The user no longer needs to review each product in detail to ensure it includes all features of interest as the modified search results ensure that each listed product already includes such features. The user's shopping experience is improved as it is less time-consuming and less burdensome to find a suitable replacement device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, by a first computing device and from an augmented reality device worn by a user, data indicating interaction with a first appliance device by the user, wherein the data indicating interaction with the first appliance device by the user comprises video data, recorded by the augmented reality device, of the user interacting with the first appliance device;
    processing, by the first computing device, the data indicating interaction with the first appliance device by the user to:
        determine a set of features for the first appliance device, and
        generate a count of a number of times each feature of the set of features is used by the user;
    comparing, by the first computing device, each generated count of the number of times each feature of the set of features is used by the user to a predetermined threshold;
    determining, by the first computing device, a subset of the set of features, each feature of the subset of the set of features having a generated count indicating a frequency of use that exceeds the predetermined threshold;
    receiving, by the first computing device, data indicating each available feature for each second appliance device of a set of second appliance devices, each second appliance device of the set of second appliance devices of a same type as the first appliance device;
    determining, by the first computing device, that at least one feature of the subset of the set of features of the first appliance device is indicated by a proprietary name;
    determining, by the first computing device, a function performed by the at least one feature of the subset of the set of features of the first appliance device that is indicated by the proprietary name;
    determining, by the first computing device and based on the determined function, a generic name for the at least one feature of the subset of the set of features of the first appliance device that is indicated by the proprietary name;
    determining, by the first computing device and based on the data indicating each available feature for each second appliance device of the set of second appliance devices and based on the generic name for the at least one feature of the subset of the set of features of the first appliance device that is indicated by the proprietary name, a subset of the set of second appliance devices, each second appliance device of the subset of the set of second appliance devices including each feature of the subset of the set of features for the first appliance device;
    causing, by the first computing device and via a user interface of a user computing device, display of information identifying each second appliance device of the subset of the set of second appliance devices; and
    causing, by the first computing device and via the user interface of the user computing device, display of information indicating availability of the subset of the set of features for each second appliance device of the subset of the set of second appliance devices.

2. The method of claim 1, wherein the data indicating interaction with the first appliance device by the user comprises audio data, recorded by the augmented reality device, of the user interacting with the first appliance device.

3. The method of claim 1, further comprising receiving additional data indicating interaction with the first appliance device by the user via a listening device, wherein the processing further comprises processing the additional data indicating interaction with the first appliance device by the user.

4. The method of claim 1, further comprising receiving additional data indicating interaction with the first appliance device by the user via a video camera, wherein the processing further comprises processing the additional data indicating interaction with the first appliance device by the user.

5. The method of claim 1, wherein the first appliance device is an Internet-of-Things (IoT) device.

6. The method of claim 5, further comprising receiving additional data indicating interaction with the first appliance device by the user via a smartphone used to control the IoT device, wherein the processing further comprises processing the additional data indicating interaction with the first appliance device by the user.

7. The method of claim 5, further comprising receiving additional data indicating interaction with the first appliance device by the user via a listening device used to control the IoT device, wherein the processing further comprises processing the additional data indicating interaction with the first appliance device by the user.

8. The method of claim 5, further comprising receiving additional data indicating interaction with the first appliance device by the user via a remote server coupled to the IoT device, wherein the processing further comprises processing the additional data indicating interaction with the first appliance device by the user.

9. The method of claim 1, wherein the video data comprises video data of the user modifying one or more settings of the first appliance device.

10. The method of claim 1, further comprising:
    determining an additional feature available to at least one second appliance device of the subset of the set of second appliance devices that is unavailable to the first appliance device;
    determining a likelihood that a frequency of usage of the additional feature exceeds the predetermined threshold;
    comparing the likelihood to a second predetermined threshold; and displaying, on the user interface, information indicating the availability of the additional feature available to the at least one second appliance device of the subset of the set of second appliance devices that is unavailable to the first appliance device when the likelihood exceeds the second predetermined threshold.

11. An apparatus comprising:
one or more processors; and
memory storing instructions that, when executed by the one or more processors, cause the apparatus to:
  receive, from an augmented reality device worn by a user, data indicating interaction with a first appliance device by the user, wherein the data indicating interaction with the first appliance device by the user comprises video data of the user interacting with the first appliance device recorded by the augmented reality device;
  process the data indicating interaction with the first appliance device by the user, to determine a set of features for the first appliance device, and to generate a count of a number of times each feature of the set of features is used by the user;
  compare each generated count of the number of times each feature of the set of features is used by the user to a predetermined threshold;
  determine a subset of the set of features, each feature of the subset of the set of features having a generated count indicating a frequency of use that exceeds the predetermined threshold;
  receive data indicating each available feature for each second appliance device of a set of second appliance devices, each second appliance device of the set of second appliance devices of a same type as the first appliance device;
  determine that at least one feature of the subset of the set of features of the first appliance device is indicated by a proprietary name;
  determine a function performed by the at least one feature of the subset of the set of features of the first appliance device that is indicated by the proprietary name;
  determine, based on the determined function, a generic name for the at least one feature of the subset of the set of features of the first appliance device that is indicated by the proprietary name;
  determine, based on the data indicating each available feature for each second appliance device of the set of second appliance devices and based on the generic name for the at least one feature of the subset of the set of features of the first appliance device that is indicated by the proprietary name, a subset of the set of second appliance devices, each second appliance device of the subset of the set of second appliance devices including each feature of the subset of the set of features for the first appliance device;
  cause a user interface of a user computing device to display information identifying each second appliance device of the subset of the set of second appliance devices; and
  cause the user interface of the user computing device to display information indicating availability of the subset of the set of features for each second appliance device of the subset of the set of second appliance devices.

12. The apparatus of claim 11, wherein the data indicating interaction with the first appliance device by the user comprises audio data of the user interacting with the first appliance device recorded by the augmented reality device.

13. The apparatus of claim 11, the memory storing instructions that, when executed by the one or more processors, cause the apparatus to receive additional data indicating interaction with the first appliance device by the user via a listening device.

14. The apparatus of claim 11, wherein the first appliance device is an Internet-of-Things (IoT) device.

15. The apparatus of claim 14, the memory storing instructions that, when executed by the one or more processors, cause the apparatus to receive additional data indicating interaction with the first appliance device via a remote server coupled to the IoT device.

16. The apparatus of claim 11, the memory storing instructions that, when executed by the one or more processors, cause the apparatus to receive additional data indicating interaction with the first appliance device via smartphone used to control the first appliance device.

17. One or more non-transitory media storing instructions that, when executed by one or more processors, cause the one or more processors to perform steps comprising:
  receive, from an augmented reality device worn by a user, data indicating interaction with a first appliance device by the user, wherein the data indicating interaction with the first appliance device by the user comprises video data of the user interacting with the first appliance device recorded by the augmented reality device;
  process the data indicating interaction with the first appliance device by the user, to determine a set of features for the first appliance device, and to generate a count of a number of times each feature of the set of features is used by the user;
  compare each generated count of the number of times each feature of the set of features is used by the user to a predetermined threshold;
  determine a subset of the set of features, each feature of the subset of the set of features having a generated count indicating a frequency of use that exceeds the predetermined threshold;
  receive data indicating each available feature for each second appliance device of a set of second appliance devices, each second appliance device of the set of second appliance devices of a same type as the first appliance device;
  determine that at least one feature of the subset of the set of features of the first appliance device is indicated by a proprietary name;
  determine a function performed by the at least one feature of the subset of the set of features of the first appliance device that is indicated by the proprietary name;
  determine, based on the determined function, a generic name for the at least one feature of the subset of the set of features of the first appliance device that is indicated by the proprietary name;
  determine, based on the data indicating each available feature for each second appliance device of the set of second appliance devices and based on the generic name for the at least one feature of the subset of the set of features of the first appliance device that is indicated by the proprietary name, a subset of the set of second appliance devices, each second appliance device of the subset of the set of second appliance devices including each feature of the subset of the set of features for the first appliance device;

cause a user interface of a user computing device to display information identifying each second appliance device of the subset of the set of second appliance devices; and cause the user interface of the user computing device to display information indicating availability of the subset of the set of features for each second appliance device of the subset of the set of second appliance devices.

* * * * *